(12) United States Patent
Mathew

(10) Patent No.: US 11,537,979 B2
(45) Date of Patent: Dec. 27, 2022

(54) SMART DEVICE FOR OPTIMIZING STORAGE SPACE AND RETRIEVAL TIME

(71) Applicant: Sujith Samuel Mathew, Mysore (IN)

(72) Inventor: Sujith Samuel Mathew, Mysore (IN)

( * ) Notice: Subject to any disclaimer, the term of this patent is extended or adjusted under 35 U.S.C. 154(b) by 880 days.

(21) Appl. No.: 16/278,900

(22) Filed: Feb. 19, 2019

(65) Prior Publication Data

US 2020/0202286 A1 Jun. 25, 2020

(30) Foreign Application Priority Data

Dec. 19, 2018 (IN) .............................. 201841047992

(51) Int. Cl.
*G06Q 10/08* (2012.01)
*H04W 4/70* (2018.01)
*H04W 4/35* (2018.01)

(52) U.S. Cl.
CPC ............ *G06Q 10/087* (2013.01); *H04W 4/35* (2018.02); *H04W 4/70* (2018.02)

(58) Field of Classification Search
CPC ......... G06Q 10/087; H04W 4/35; H04W 4/70
See application file for complete search history.

(56) References Cited

U.S. PATENT DOCUMENTS

| | | | | |
|---|---|---|---|---|
| 5,785,181 A * | 7/1998 | Quartararo, Jr. | ........ | G06K 17/00 209/3.3 |
| 5,897,004 A * | 4/1999 | Neugebauer | .......... | B65G 47/61 211/113 |
| 7,133,740 B1 * | 11/2006 | Stenson | ................. | G06Q 10/08 700/215 |
| 9,624,035 B1 * | 4/2017 | Williams, Jr. | ........ | B65G 1/0457 |
| 2002/0066644 A1 * | 6/2002 | Hierrezuelo | .......... | E05B 69/006 198/678.1 |
| 2005/0189457 A1 * | 9/2005 | Wang | ................. | A47G 25/0685 248/292.12 |
| 2006/0005071 A1 * | 1/2006 | Fu | ........................... | D06F 93/00 714/5.1 |
| 2008/0136598 A1 * | 6/2008 | Chen | .................... | G06K 7/0008 340/10.1 |
| 2010/0019035 A1 * | 1/2010 | Larson | ................. | G06Q 10/087 235/385 |
| 2010/0049635 A1 * | 2/2010 | Delaney | ................. | G06Q 10/08 705/28 |
| 2017/0090450 A1 * | 3/2017 | Taite | ...................... | A47B 61/00 |
| 2018/0173807 A1 * | 6/2018 | Prakash | ................ | H04W 76/10 |

OTHER PUBLICATIONS

Edinbarough et al. "Process Automation in Smart Environments: Intelligent Closet Prototype". Conference paper 2018 ASEE Conference for Industry and Education Collaboration—San Antonio. Feb. 2018. (Year: 2018).*

Goh et al. "Developing a smart wardrobe system," 2011 IEEE Consumer Communications and Networking Conference (CCNC). 2011. (Year: 2011).*

* cited by examiner

*Primary Examiner* — Nathan A Mitchell

(57) ABSTRACT

The present invention discloses a smart device (100) for optimizing storage space. The smart device (100) comprising a processor (104); a plurality of slots (102), wherein each slot holds at-least one hanger (106) wherein the processor (104) is enabled to communicate with all the slots (102) to determine their status like occupancy, description of the garment or similar item on the particular hanger, and weight of garment or similar information.

6 Claims, 3 Drawing Sheets

SMART DEVICE FOR OPTIMIZING STORAGE SPACE AND RETRIEVAL TIME

FIELD OF INVENTION

The present invention relates to the application of Internet of Things (IoT) technology in the field of supply chain. More specifically, the present invention is related to a smart device for optimizing storage space and access time in warehouses and similar areas used for storage.

BACKGROUND

Warehouses, shopping centers, departmental stores or wherever there is bulk storage, there has been always an issue to optimize space and also to locate stored items quickly. Generally, warehouses are challenged with unstructured storage, temporary storage, and/or frequent handling of outbound deliveries to retailers or consumers. It becomes very difficult for workers to identify appropriate space for keeping items and also to locate them as and when required.

In a typical warehouse that stores garments and similar items on Hangers, there are shipments with thousands in numbers to be stored and managed. These items are first segregated (to know what is stored where), and then carefully tagged for identification and hung on rods. In high end stores and warehouses, the rods are identified with a barcode and also an alphanumeric code. Each rod would have hundreds of garments and similar items. The information in the system only indicates that the particular item is available on the rod. Whenever it is required for garments and similar items to be moved to a store or to any other location, an operator is assigned to locate the garments and similar items in the warehouse and move it appropriately.

The whole processes of storing or retrieval is time consuming, costly, inefficient, and involves a lot of manual effort. Moreover, since these garments and similar items have to be segregated and allocated to specific locations in the warehouse, space utilization is not optimal i.e. anything cannot be stored anywhere. For instance, if a particular location in the warehouse is allocated for garments and similar items of a particular brand, then no other brands are stored in that location, to make it easy to locate the garments. Therefore, lot of space is wasted, because garments and similar items cannot be stored anywhere and correctly located later.

There are many patent and non-patent literatures which have disclosed the solutions for aforementioned problems. Some of them are as listed below:

A Chinese Patent Application 105747560A titled a smart wardrobe based on the Internet of Things discloses an intelligent wardrobe for a home based on the Internet of Things which includes a hanger bar and hangers.

Further Chinese Patent Application 106096845A titled intelligent store big data analysis service platform based on Internet of things technology discloses a platform comprising of a production management system, a finished product warehouse system, an intelligent store system, and a computer management system. The intelligent store system comprises multiple RFID tags, a store management system, an electronic shelf system, and a fitting room system.

There is a U.S. Pat. No. 9,327,397, B1 titled Telepresence based inventory pick and place operations through robotic arms affixed to each row of a shelf which discloses a system and/or a method of telepresence-based inventory pick and place operations through actuator controlled robotic arms affixed to each row of a shelf. The method includes mounting a robotic arm at one end of a row in a shelf of inventory on a set of rails affixed to the row of the shelf. The robotic arm is permitted to move horizontally along the row of the shelf.

However, none of the prior art directly target the bulk storage of garments or other utility items on hanger in warehouses to optimize space utilization and retrieval time. Some solutions use RFID technology to identify locations in wardrobes and stores, where the items are tagged with RFID tags. These solutions are inaccurate and difficult to use since the RFID antennas identify tags in wide physical range and therefore cannot individually identify an item to its unique location. Therefore, these systems are complex, error prone, and waste a lot of time to identify a single item.

Despite the advancements offered by prior art, a need remains for further improvements, particularly for optimizing storage space and access item for individual items. In view of the aforementioned, there remains the requirement to provide an intelligent process and smart devices for optimizing storage space and access time in warehouses and the like to improve the overall efficiency of the supply chain processes.

SUMMARY OF THE INVENTION

Embodiments of the present invention disclose a smart device for optimizing storage space and access time in warehouses and similar storage spaces. The smart device comprises of a processor; a plurality of slots where each slot is either in a locked or unlocked state, wherein each slot holds at least one hanger wherein the processor is enabled to communicate with all the slots to determine their status like occupancy, description of the garment or similar item on the particular hanger, and weight of garment or similar item.

In an aspect of the present invention, the smart device for optimizing storage space represents a rod which uses the Internet of Things (IoT) technology to optimize storage space, binning time, and retrieving time in warehouses that store garments and similar items on hangers.

In an aspect of the present invention, the smart device for optimizing storage space includes mechanical, electronics, and software components that help to make intelligent decision on how and where to store the garments and similar items.

The smart device for optimizing storage space is made of individual slots, where each slot holds one garment or similar item on hanger i.e. many slots are attached together to form as a smart rod. The smart rod optimizes storage space and it comprises a processor which acts as brain of the smart device. The processor is enabled to communicate instructions to all the slots to determine their status like occupancy, description of garment and similar item and weight. The processor also communicates with the slots to lock or unlock so as to enable an item to be picked or stored which is visually identified with a multicolor LED that each slot has. The processor also uniquely identifies each slot on the smart device. The processor is enabled to work with wireless interfaces to communicate with external entities the status of the smart device.

The smart device further comprises slots that are not provided for holding garments, called the glue slots. The glue slots are used to provide support for the smart device.

It is an object of the present invention to provide a smart device which uses the Internet of Things (IoT) technology to optimize storage space, binning time, and retrieving time in warehouses and a like.

It is another object of the present invention to provide a smart device which helps in storage without segregation, where anything is stored anywhere and retrieval of garments and similar items on hangers in warehouses and the like.

It is a further object of the present invention to provide a smart device which overcomes issues of prior art by optimizing space and access time and also reduces a lot of errors in handling large quantities of garments and similar items. To add to these benefits, this invention can be physically integrated into any warehouse without making major changes to the layout and current storages and can also easily integrate with any of the existing warehouse management systems.

This invention is pointed out particularly with the appended claims.

Additional features and the advantages of the present invention will become apparent to those skilled in the art by referring to the following detailed description taken in conjunction with the accompanying drawings.

BRIEF DESCRIPTION OF DRAWING

Other objects, features, and advantages of the present subject matter will be apparent from the following description when read with reference to the accompanying drawings. Drawings are illustrated with different views according to different embodiments of the invention.

DETAILED DESCRIPTION OF EMBODIMENTS

The present invention will now be described in brief with reference to the accompanying drawings. Now, refer in more detail to the exemplary drawings for the purposes of illustrating non-limiting embodiments of the present invention.

As used herein, the term 'processor' refers to conventional or novel general-purpose single or multi-chip processor or microprocessor or microcontroller that executes instructions and manipulates information stored in data storage or memory, such as the computer readable storage medium, and/or the processor accesses information wirelessly over an Internet access point, from server or remote data storage.

The exemplary methods described below are typically stored on a computer-readable storage medium, which may be any device that can store code for use by a computer system, mobile and others. The computer-readable storage medium includes, but is not limited to volatile memory, non-volatile memory, magnetic and optical storage devices such as disk drives, magnetic tape, CDs (compact discs), DVDs (digital versatile discs or digital video discs), or other media capable of storing code now known or later developed.

Furthermore, methods described herein can be embossed on hardware modules or apparatus. These modules or device may include, but are not limited to, an application-specific integrated circuit (ASIC) chip, a field-programmable gate array (FPGA), a dedicated or shared processor that executes a particular software module or a piece of code at a particular time, and/or other programmable-logic devices known or later developed. When the hardware modules or sub-modules are activated, they perform the methods and processes included within them.

An embodiment of the present invention provides a smart device (100) for optimizing storage space and access time in warehouses and alike.

Figure 1:
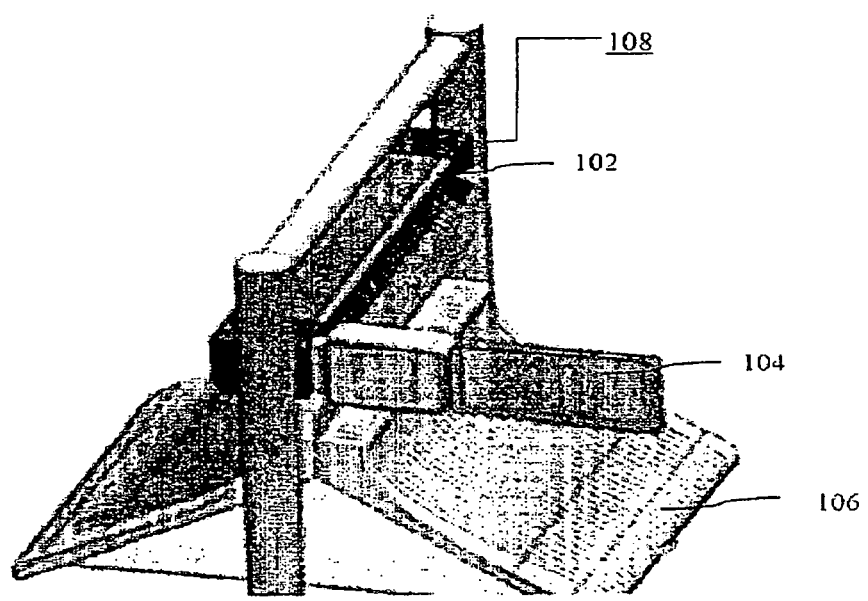
FIG. 1 is a schematic of a smart device (100) for optimizing storage space and retrieval time in accordance with an embodiment of the present invention.
Figure 2:
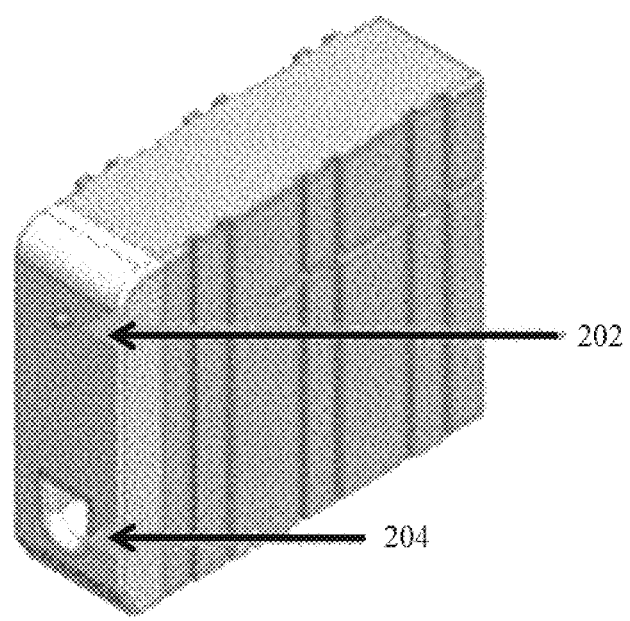
FIG. 2 is a schematic of the slot of the smart device (100) for optimizing storage space in accordance with an embodiment of the present invention.

Referring to FIG. 1, the smart device (100) includes individual slots (102), where each slot holds one hanger (106) i.e. many slots are attached together to form the smart device (100) as a Smart Rod. The smart device (100) further includes a processor (104) which acts like a brain of the smart device.

In an embodiment of the present invention, the processor (104) is enabled to communicate with all the slots (102) to determine their status like occupancy, description of the garment or similar item on the particular hanger, and weight of garment or similar item.

In another embodiment of the present invention, the description of the garment or similar item on the particular hanger such as weight, brand, price, material and other specification related to the item etc. of garment or similar item are stored in a storage device of the smart device or retrieved from an external product database.

The processor (104) works along with a wireless interface to communicate with external entities the status of the smart device (100).

Figure 3:
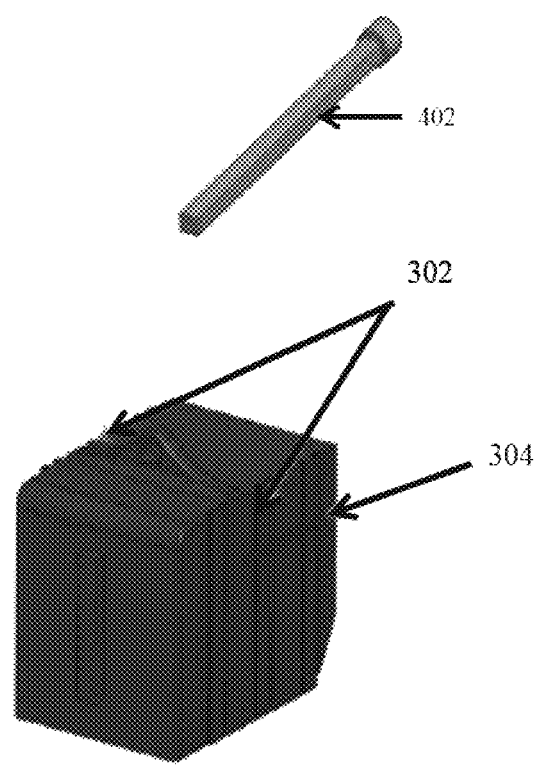
FIG. 3 is a schematic of the glue slot of the smart device (100) for optimizing storage space in accordance with an embodiment of the present invention

Referring to FIG. 3, the smart device (100) also has slots that do not hold garments, called the glue slots. The glue slots are used to provide support for the smart device (100).

In an embodiment of the present invention, every slot is locked in with adjacent slots using vertical grooves (302). Additionally, with the help of a locking pin (402), the slots are locked into position using the horizontal grooves (304). The locking pins (402) is inserted into the horizontal groove (304). Moreover, the glue slot (108) in FIG. 3 is used to attach or hang the smart device to frames or structures that are used in warehouses to hold the rods in place. This arrangement of holding slots together and the use of the glue slots (108) provide strength and support for the smart rod and items hung from it.

In an embodiment of the present invention, each slot has a multicolor LED (202). Within the proximity of the smart rod, as the processor receives a request from the assigned operator it triggers to open or close one particular slot (204) and the LED on the slot (202) glows with the color indicated from the operator's device. The processor handles multiple requests at a time, where each request renders a different color for the LED (202). The operator can quickly identify and pick the garment or similar item and move on to the next task. This saves a lot of time in picking items from the smart device (100) and thereby dramatically improves the picking time.

In an embodiment of the present invention, the smart device (100) provides interfaces through the processor for external entities to determine the status of the smart device (100) i.e. the availability of garments or similar items, the total weight, etc. These interfaces are available as firmware on the brain (104). The processor of the smart device (100) also provides interfaces for external entities to configure the smart device (100) i.e. provide connectivity settings for further access. Any system such as operators' computers, mobile phone or any other handheld device etc. that is integrated to the smart device (100) will communicate with the smart device (100) wirelessly to read or change the status of the rod.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention. As it will be readily apparent to those skilled in the art, the present invention may easily be produced in other specific forms without departing from its essential characteristics. The present embodiment is, therefore, to be considered as merely illustrative and not restrictive.

I claim:

1. A smart device (100) for optimizing storage space comprising:
   a processor (104);
   a plurality of slots (102), wherein each slot holds at least one hanger (106) wherein the processor (104) is enabled to communicate with all the slots (102) to determine their status that comprises occupancy and description of a garment on a particular hanger, wherein as the processor (104) receives a request from an assigned operator within its proximity, wherein the request from the assigned operator triggers the processor (104) to open up one particular slot (204) and the corresponding LED on that slot (202) glows: and
   a plurality of glue slots (108) that are designed to provide support for the smart device (100), wherein each glue slot (108) is used to one of attach and hang the smart device (100) to one of frames and structures that are used in the storage space,
   wherein each of the plurality of slots (102) is locked in with adjacent slots using vertical grooves (302) and with the help of a locking pin (402) using horizontal grooves (304), the locking pin (402) is inserted into the horizontal grooves (304).

2. The smart device (100) as claimed in claim 1, wherein the further plurality of individual slots (102), are attached together to form the smart device (100) as a smart rod.

3. The smart device (100) as claimed in claim 1, wherein the processor (104) works along with a wireless interface to communicate with external entities regarding the status of the smart device (100).

4. The smart device (100) as claimed in claim 1, wherein each of the plurality of slots (102) has a multi-color LED and a place to hold a hanger (204).

5. The smart device (100) as claimed in claim 1 further comprises a plurality of interfaces through the processor for external entities to determine the status of the smart device (100).

6. The smart device (100) as claimed in claim 1, wherein the description of the garment item includes one or more of: weight, brand, price, material and other specification related to the garment.

* * * * *